(12) United States Patent  (10) Patent No.: US 8,191,147 B1
Gardner et al.  (45) Date of Patent: May 29, 2012

(54) METHOD FOR MALWARE REMOVAL BASED ON NETWORK SIGNATURES AND FILE SYSTEM ARTIFACTS

(75) Inventors: Patrick Gardner, Northridge, CA (US); Shane Pereira, Newbury Park, CA (US)

(73) Assignee: Symantec Corporation, Mountain View, CA (US)

( * ) Notice: Subject to any disclaimer, the term of this patent is extended or adjusted under 35 U.S.C. 154(b) by 938 days.

(21) Appl. No.: 12/109,253

(22) Filed: Apr. 24, 2008

(51) Int. Cl.
*G06F 12/14* (2006.01)

(52) U.S. Cl. .......................................................... 726/24

(58) Field of Classification Search .................... 726/22, 726/23, 24
See application file for complete search history.

(56) References Cited

U.S. PATENT DOCUMENTS

| | | | |
|---|---|---|---|
| 6,357,008 B1 * | 3/2002 | Nachenberg | 726/24 |
| 2005/0262566 A1 * | 11/2005 | Gassoway | 726/24 |
| 2006/0161984 A1 * | 7/2006 | Phillips et al. | 726/24 |
| 2006/0282891 A1 * | 12/2006 | Pasko | 726/23 |

* cited by examiner

*Primary Examiner* — Ellen Tran
(74) *Attorney, Agent, or Firm* — McKay and Hodgson, LLP; Serge J. Hodgson; Sean P. Lewis

(57) ABSTRACT

A network communication corresponding to a malicious network signature associated with malicious code is detected on a host computer system. A determination is made whether or not the malicious network signature is validated as associated with a non-malicious code process. Upon a determination that the malicious network signature is not validated, the corresponding network communication is blocked, and the associated malicious code is located on the host computer system and removed from the host computer system. In some embodiments, the host computer system is further evaluated for the presence of residual artifacts of the malicious code on the host computer system.

17 Claims, 3 Drawing Sheets

METHOD FOR MALWARE REMOVAL BASED ON NETWORK SIGNATURES AND FILE SYSTEM ARTIFACTS

BACKGROUND

1. Field of the Invention

The present invention relates to computer system security. More particularly, the present invention relates to identifying and removing malicious code from a computer system.

2. Description of the Related Art

Traditional file-based malicious code signatures, also called anti-viral (AV) signatures, have become increasingly more difficult to use as a viable technique for detecting malicious code, commonly termed malware. Malicious code authors have been quickly developing advanced techniques to modify the binary malicious code files to evade detection by file-based AV signature techniques. A common evasion technique being used today is for the malicious code author to simply apply a packer or a level of custom obfuscation to an existing malicious code, thereby creating a new variant of the malicious code. The new variant behaves the same as the original malicious code but typically cannot be detected by a file-based AV signature developed for the original malicious code.

There are many standard malicious code sets, commonly called toolkits, available on the web today that malware authors can use to simply "repack" or modify existing malicious code to evade file-based AV signature detection. Applying the repacking toolkit usually does not even require a malicious code author to have significant development skills or access to the malicious code source itself; a new variant can be created by simply repacking the executable code.

SUMMARY OF THE INVENTION

In accordance with one embodiment, a method includes detecting a malicious network signature on a host computer system, the malicious network signature being associated with malicious code; determining whether or not the malicious network signature is validated as associated with non-malicious code; upon a determination that the network signature is not validated as associated with non-malicious code, locating the malicious code on the host computer system; and, removing the malicious code from the host computer system. In some embodiments, a determination is made whether or not residual artifacts, such as files associated with the malicious code, registry key settings associate with the malicious code, and/or other residual evidence associated with the malicious code, are present on the host computer system.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
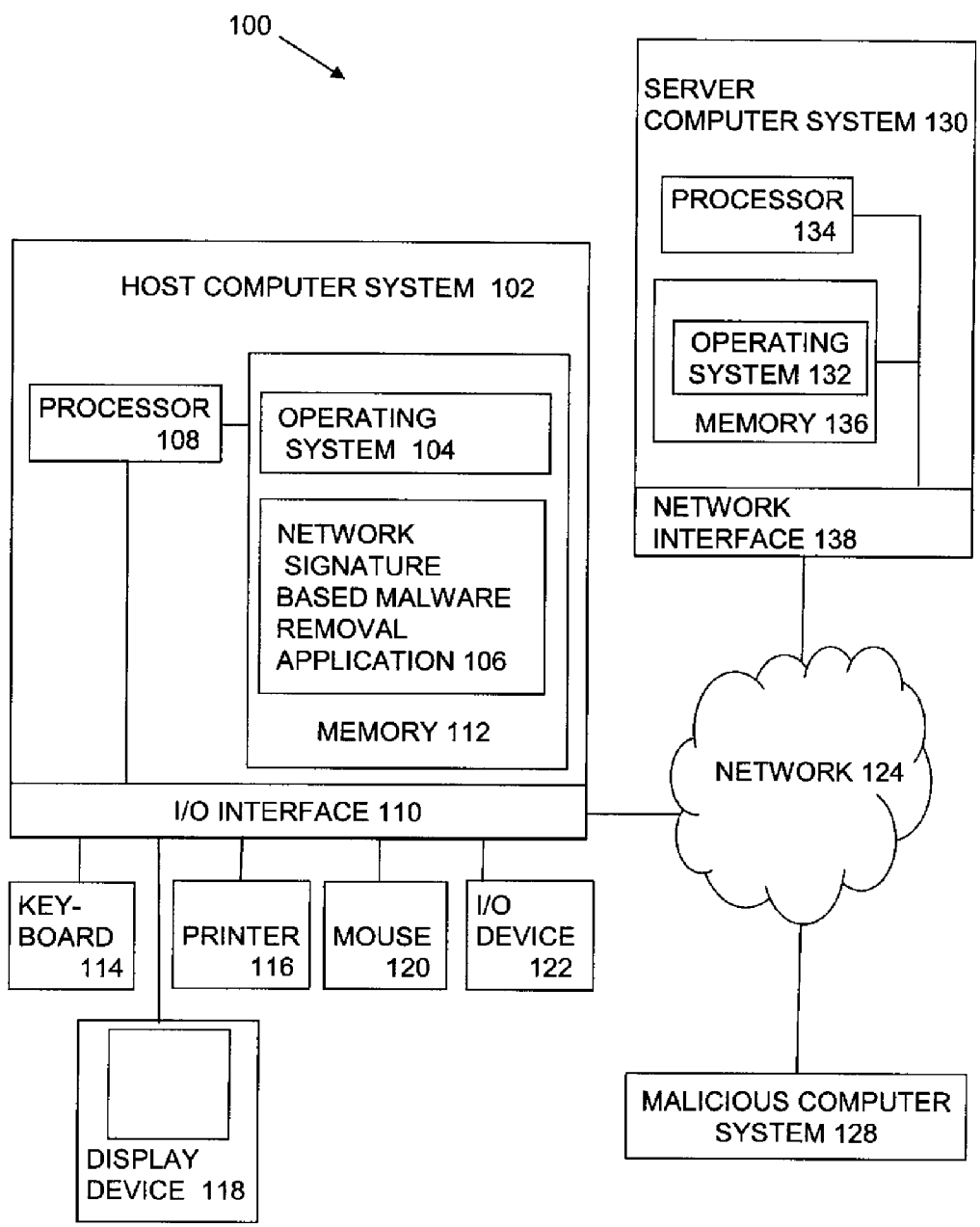
FIG. 1 is a diagram of a computer system including a network signature based malware removal application executing on a host computer system in accordance with one embodiment.

Many malicious codes utilize some form of network connectivity to connect a malicious computer system with a compromised, e.g., infected, host computer system so that information can be gathered from the compromised host computer system. For example, the malicious computer system can be a command and control server for bots, a data repository server for key loggers and other information stealers, a browsing history server for trackware, or an auto-update server which deploys new versions of malware to the infected host computer system.

Embodiments described herein utilize a network-based approach to identify and remove malicious code from a host computer system. In particular, referring generally to FIG. 3, in one embodiment, a malicious network signature associated with a known malicious code is detected on a host computer system (operation 304). A determination is made whether or not the malicious network signature is validated as associated with non-malicious code, e.g., is excluded as being associated with malicious code (operation 308). If the malicious network signature is validated as associated with non-malicious code, the malicious code is located on the host computer system (operation 310) and the malicious code is removed from the host computer system (operation 312). In some embodiments, a notification is generated and sent to the user and/or a security center (operation 314).

In some embodiments, one or more residual artifacts associated with the malicious code are searched for on the host computer system and used in determining whether or not the malicious code is present on the host computer system (operation 306).

Referring now more particularly to FIG. 1, FIG. 1 is a diagram of a computer system 100 that includes a network signature based malware removal application 106 executing on a host computer system 102 in accordance with one embodiment.

Host computer system 102, sometimes called a client or user device, typically includes a central processing unit (CPU) 108, sometimes called a processor 108, an input/output (I/O) interface 110, and a memory 112. Host computer system 102 further includes standard devices like a keyboard 114, a mouse 120, a printer 116, and a display device 118, as well as one or more standard input/output (I/O) devices 122, such as a compact disk (CD) or DVD drive, floppy disk drive, or other digital or waveform ports for inputting data to and outputting data from host computer system 102.

In one embodiment, network signature based malware removal application 106 is stored, for example, in memory 112 of host computer system 102, and executed on host computer system 102. In one embodiment, network signature based malware removal application 106 is loaded into host computer system 102 via I/O device 122, such as from a CD, DVD, or floppy disk containing network signature based malware removal application 106.

Host computer system 102 is coupled to a server computer system 130 of computer system 100 by a network 124. Server computer system 130 typically includes a processor 134, a memory 136, and a network interface 138. In one embodiment, memory 136 includes an operating system 132.

Host computer system 102 is also coupled to a malicious computer system 128 by network 124. In one embodiment, malicious computer system 128 is capable of communicating with host computer system 102 over network 124. More particularly, malicious computer system can communicate with and/or gather information from malicious code (not shown) operating on host computer system 102.

In one embodiment, malicious computer system 128 is similar to host computer system 102, for example, includes a central processing unit, an input output (I/O) interface, and a memory. Malicious computer system 128 may further include standard devices like a keyboard, a mouse, a printer, a display device and an I/O device(s). The various hardware components of malicious computer system 128 are not illustrated to avoid detracting from this embodiment.

Network 124 can be any network or network system that is of interest to a user. In various embodiments, network interface 138 and I/O interface 110 include analog modems, digital modems, or a network interface card. Further, the particular type of and configuration of host computer system 102, server computer system 130, and malicious computer system 128, are not essential to this embodiment.

Herein, in one embodiment, malicious code is defined as any computer program, application, set of applications, or code that enters a computer system environment without an authorized user's knowledge and/or without an authorized user's consent. Thus, for example, a user may consent to installation of seemingly non-malicious code unaware that the installed code in actuality includes malicious code that compromises the user's computer system, such as malicious code that includes an end-user license agreement (EULA) that the user consents to. Herein the term malware is used interchangeably with malicious code.

Figure 2:
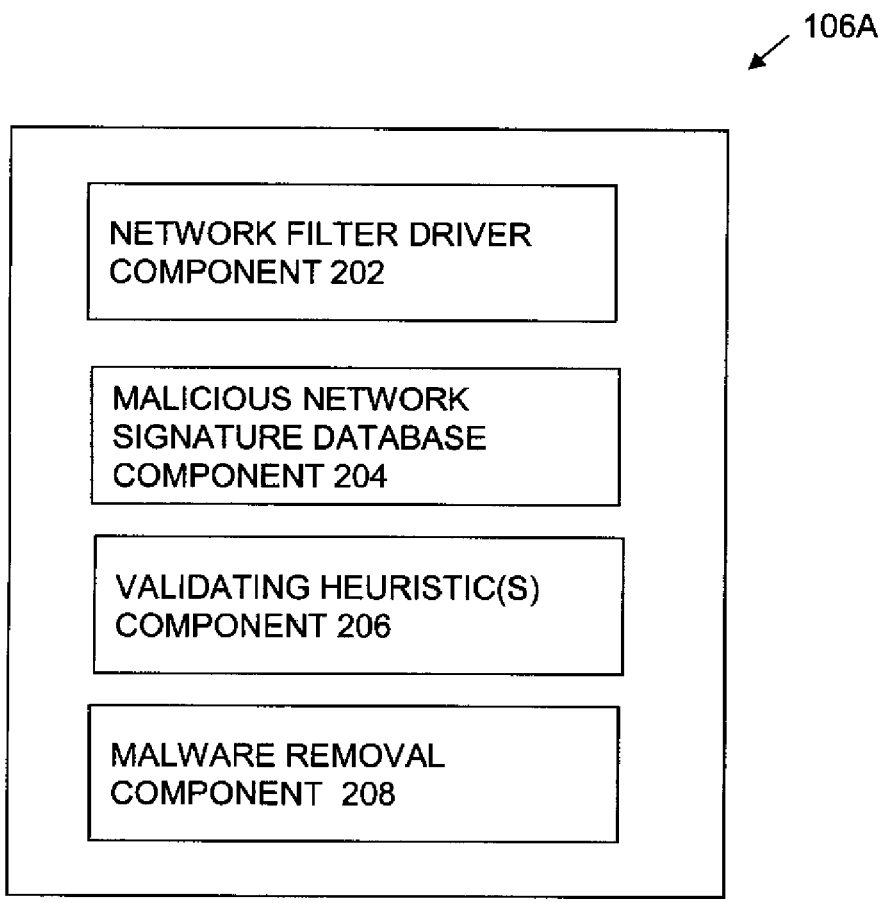
FIG. 2 is a box diagram of the network signature based malware removal application of FIG. 1 in accordance with one embodiment.

FIG. 2 is a block diagram of network signature based malware removal application 106 of FIG. 1 in accordance with one embodiment. In one embodiment, network signature based malware removal application 106A includes: a network filter driver component 202; a malicious network signature database component 204; a validation heuristic(s) component 206; and, a malware removal component 208.

In one embodiment, network filter driver component 202, also referred to herein as network filter driver 202, includes a protocol decoding engine to detect packets, e.g., network packets, coming from malware on the network stack (not shown) utilized by operating system 102. Thus, in one embodiment, network filter driver 202 extends the network stack of host computer system 102 and sees network traffic, both incoming traffic and outgoing traffic. For example, network filter driver 202 can inspect incoming network traffic, i.e., inbound data packets, prior to receipt by a target application on host computer system 102; and further, network filter driver 202 can inspect outgoing network traffic, i.e., outbound data packets, prior to exiting host computer system 102.

In one embodiment, network filter driver 202 is implemented as a kernel mode network filter driver. In one embodiment, network filter driver 202 utilizes malicious network signature database component 204 in detecting malicious network signatures.

In one embodiment, malicious network signature database component 204, also referred to herein as malicious network signature database 204, is a storage structure, such as in memory, including one or more entries of malicious network signatures, each identifying an associated malicious code, such as an individual malicious code or a family of malicious code. Herein each of the one or more entries is termed a malicious network signature entry.

In one embodiment, a malicious network signature entry further identifies one or more residual artifacts associated with the malicious network signature. Herein, in one embodiment, a residual artifact is a file(s), registry key(s), host file entry, and/or other known residual evidence that can be found on a host computer system infected with the associated malicious code. One example of a residual artifact is a registry key with a specific value of "svch00t.exe" in the RUN key of the registry of host computer system 102. In some embodiments, a malicious network signature entry further includes a residual artifacts required flag for indicating whether or not the presence of one or more residual artifacts identified in the malicious network signature are required on a host computer system.

Network signatures and the development of network signatures to detect a known piece of malicious code are well known to those of skill in the art. For example, a malicious network signature can be written to detect a known piece of malware using a particular type of HTTP request containing a user's URL browsing history. Network signatures can be developed, for example, using protocol aware Internet Prevention System (IPS) engine technology.

In one embodiment, validating heuristic(s) component 206 includes one or more methods and/or items that can be utilized to determine whether or not a network signature is associated with non-malicious code, i.e., a legitimate process, rather than associated with malicious code. For example, in one embodiment, validating heuristic(s) component 206 can include a digital signature that is associated with a legitimate process, a known publisher associated with a legitimate process, and/or a visible user interface (UI) that is viewable by a user of host computer system 102. Thus, in some embodiments, validating heuristic(s) component 206 can further include, or have access to, listings, databases, or other memory structures, utilized by the validating heuristic(s).

In one embodiment, malware removal component 208 includes one or more methods for removing malicious code from host computer system 102. In one embodiment, the one or more methods can remove files associated with the malicious code, registry settings associated with the malicious code, and/or other modifications made to host computer system 102 by the malicious code. In some embodiments, the one or more methods are not present in malware removal component 208, for example, belong to an overarching IPS engine, but are accessible by malware removal component 208.

Figure 3:
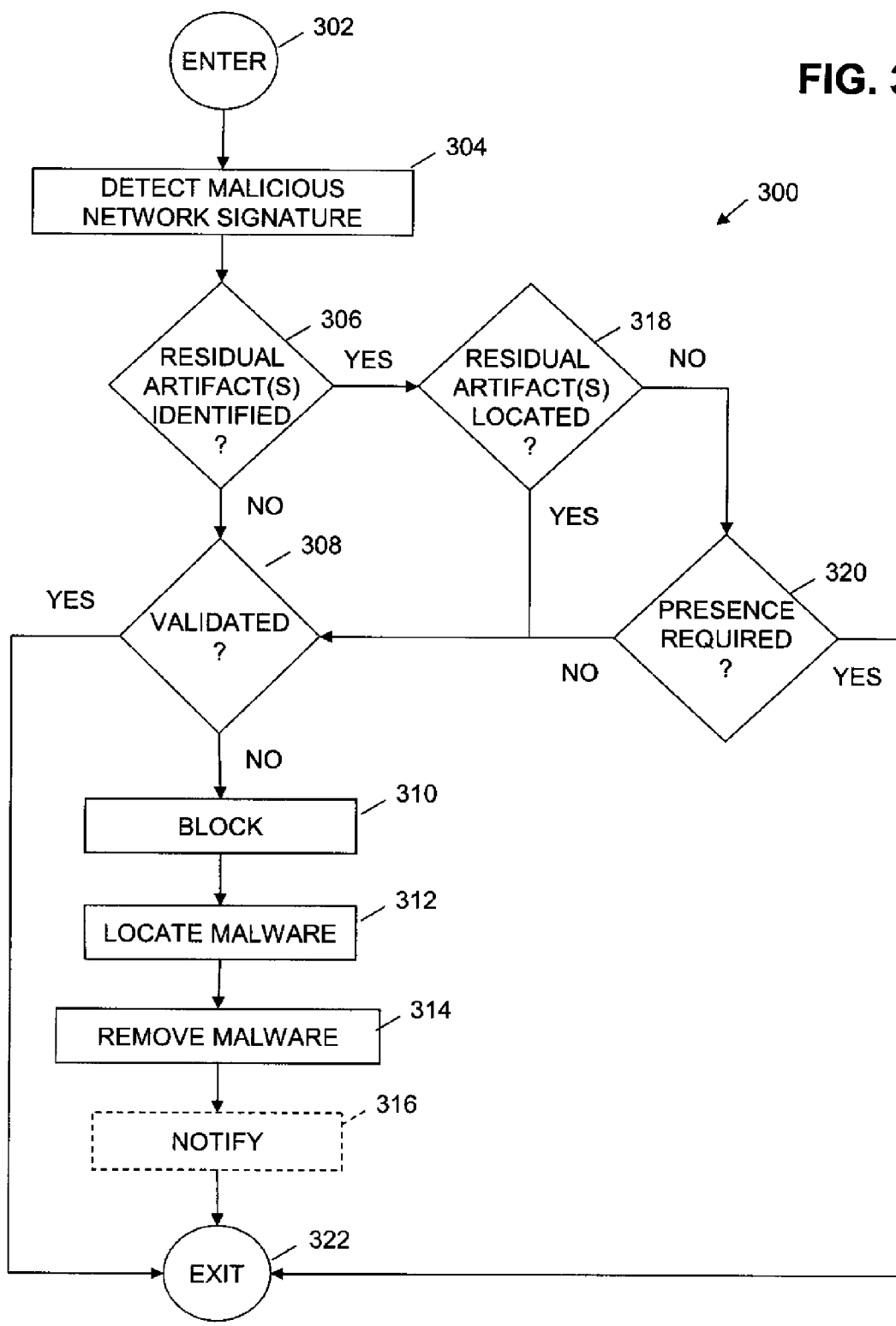
FIG. 3 is a flow diagram of a network signature based malware removal process in accordance with one embodiment.

FIG. 3 is a flow diagram of a process 300 for network signature based malware removal in accordance with one embodiment. Referring now to FIGS. 1, 2 and 3 together, in one embodiment, execution of network signature based malware removal application 106 by processor 108 results in the operations of method 300 as described below. Method 300 is entered at an ENTER operation 302, flow moves to a DETECT MALICIOUS NETWORK SIGNATURE operation 304.

In DETECT MALICIOUS NETWORK SIGNATURE operation 304, in one embodiment, a malicious network signature is detected on host computer system 102. More particularly, in one embodiment, network filter driver 202 inspects network communications on a network stack (not shown) of host computer system 102 and compares the network communications against known malicious network signatures identified as entries in malicious network signature database 204.

When a network communication corresponds to a malicious network signature entry in malicious network signature database 204, e.g., maps to a known malicious code or family of malicious code that exhibits the malicious network signature, a malicious network signature is detected on host computer system 102. From DETECT MALICIOUS NETWORK SIGNATURE operation 304, processing transitions to an optional RESIDUAL ARTIFACT(S) IDENTIFIED check operation 306. Otherwise, processing transitions directly from DETECT MALICIOUS NETWORK SIGNATURE operation 304 to a VALIDATED check operation 308, further described later herein.

In RESIDUAL ARTIFACT(S) IDENTIFIED check operation 306, in one embodiment, a determination is made whether or not one or more residual artifacts are identified in the corresponding malicious network signature entry. In one embodiment, the malicious network signature entry corresponding to the malicious network signature detected in operation 304 is read to determine if one or more residual artifacts are identified in the entry.

In one embodiment, if one or more residual artifacts are not identified in the malicious network signature entry ("NO"), processing transitions from RESIDUAL ARTIFACT(S) IDENTIFIED check operation 306 to a VALIDATED check operation 308, further described later herein. Alternatively, if one or more residual artifacts are identified in the malicious network signature entry ("YES"), from RESIDUAL ARTIFACT(S) IDENTIFIED check operation 306, processing transitions to a RESIDUAL ARTIFACT(S) LOCATED check operation 318.

In RESIDUAL ARTIFACT(S) LOCATED check operation 318, in one embodiment, host computer system 102 is evaluated to determine if the one or more residual artifacts identified in the corresponding malicious network signature are present on host computer system 102, i.e., are located on host computer system 102. In one embodiment, network signature based malware removal application 106 searches host computer system 102 for the one or more residual artifacts identified in the corresponding malicious network signature entry.

In one embodiment, if the one or more residual artifacts are located on host computer system 102 ("YES"), malicious code is assumed to be present on host computer system 102. In some embodiments, if at least one of the one or more residual artifacts is present on host computer system 102, malicious code is assumed to be present on host computer system 102. From RESIDUAL ARTIFACT(S) LOCATED check operation 318, processing transitions to VALIDATED check operation 308, further described herein.

Alternatively, if the one or more residual artifacts are not located on host computer system 102 ("NO"), from RESIDUAL ARTIFACT(S) LOCATED check operation 318, processing transitions to a PRESENCE REQUIRED check operation 320.

In PRESENCE REQUIRED check operation 320, in one embodiment, a determination is made whether or not the presence of the one or more residual artifacts on host computer system 102 is required to continue assuming malicious code is present on host computer system 102. In one embodiment, a residual artifacts required flag present in the corresponding malicious network signature entry is examined to determine whether or not the presence of the one or more residual artifacts is required.

For example, in one embodiment, if the residual artifacts required flag is set, for example, has a value of one, the presence of the one or more residual artifacts on host computer system 102 is required. Alternatively, if the residual artifacts required flag is not set, for example, has a value of zero, the presence of the one or more residual artifacts on host computer system 102 is not required to continue assuming malicious code is present on host computer system 102.

In another embodiment, a security rules set is examined to determine whether or not the presence of the one or more residual artifacts on host computer system 102 is required. In another embodiment, a user or default setting indicating whether or not the presence of the one or more residual artifacts on host computer system 102 is required is evaluated to make the determination.

Recall that at this point in the processing the one or more residual artifacts were not located on host computer system 102. Thus, in one embodiment, upon a determination that the presence of the one or more residual artifacts on host computer system 102 is required ("YES"), from PRESENCE REQUIRED check operation 320, processing transitions to an EXIT operation 322, with processing exiting method 300, or optionally returning to operation 304 on detection of a next malicious network signature. Alternatively, upon a determination that the presence of the one or more residual artifacts on host computer system 102 are not required ("NO"), from PRESENCE REQUIRED check operation 320, processing transitions to VALIDATED check operation 308.

In VALIDATED check operation 308, a determination is made whether or not the malicious network signature is validated as associated with a non-malicious process, e.g., is associated with legitimate process, rather than with malicious code. Viewed another way, check operation 308 excludes from further processing malicious network signatures that are determined to be associated with non-malicious, e.g., legitimate, processes.

In one embodiment, network signature based malware removal application 106 performs one or more validating heuristics to determine whether or not the malicious network signature is validated as associated with non-malicious code. For example, in one embodiment, a digital signature associated with the malicious network signature detected in operation 304 is evaluated against a listing of known legitimate digital signatures, or validated to a digital signature database.

In another example, in one embodiment, the publisher associated with the malicious network signature is evaluated against a listing of known legitimate known publisher(s). In another example, in one embodiment, a determination is made whether the process associated with the malicious network signature displays a visible user interface (UI) to the user of host computer system 102.

In one embodiment, if the malicious network signature is validated as associated with non-malicious code based on the performance of the validating heuristic(s) ("YES"), the malicious network signature is assumed to not be associated with malicious code on host computer system 102. From VALIDATED check operation 308, processing transitions to EXIT operation 322, with processing exiting method 300, or optionally returning to operation 304 on detection of a next malicious network signature.

Referring again to VALIDATED check operation 308, alternatively, in one embodiment, if the malicious network signature is not validated as associated with non-malicious code based on the performance of the validating heuristic(s) ("NO"), the malicious network signature is assumed to be associated with malicious code on host computer system 102. From VALIDATED check operation 308, processing transitions to a BLOCK operation 310.

In BLOCK operation 310, the network communication corresponding to the malicious network signature detected in operation 304 is blocked from proceeding to its destination, such as an application on host computer system 102, or from being sent from host computer system 102. In this way, applications on host computer system 102 or systems outside host computer system 102 are protected from receipt of the network communication associated with malicious code. Blocking of the network communication can be performed using any of a variety of communication blocking techniques well known to those of skill in the art and not further described herein to avoid detracting from the description. From BLOCK operation 310, processing transitions to a LOCATE MALWARE operation 312.

In LOCATE MALWARE operation 312, the malicious network signature located in operation 304 is used to trace back to the associated malicious code on host computer system 102. More particularly, the network communication associated with the malicious network signature is used to locate files associated with the malicious code, registry keys associated with the malicious code, and/or other modifications made to host computer system 102 by the malicious code, on host computer system 102.

Trace back of a network stack communication to an associated process is well known to those of skill in the art and not further described herein to avoid detracting from the description. From LOCATE MALWARE operation 312, processing transitions to a REMOVE MALWARE operation 314.

In REMOVE MALWARE operation 314, the malicious code associated with the malicious network signature and the residual artifacts located in operation 318, if any, are removed from host computer system 102. More particularly, in one embodiment, malware removal component 208 terminates any running malicious code process(es) and deletes any files associated with the malicious code, registry keys associated with the malicious code, and/or other modifications made to host computer system 102 by the malicious code, including one or more residual artifacts, if any, from host computer system 102. Techniques for removal of malicious code, as well as residual artifacts of malicious code, are well known to those of skill in the art and any one of a number of techniques can be used. From REMOVE MALWARE operation 314, processing optionally transitions to a NOTIFY operation 316. If NOTIFY operation 316 is not performed, processing transitions directly to EXIT operation 322, or optionally returns to operation 304 on detection of a next malicious network signature.

In NOTIFY operation 316, in one embodiment, the user of host computer system 102 and/or administrator are notified, e.g., by a pop-up window, by logging to a file, or otherwise by another type of notification, that known malware has been detected and removed from host computer system 102. From NOTIFY operation 316, processing transitions to EXIT operation 322, or optionally returns to operation 304 on detection of a next malicious network signature.

Referring again to FIG. 1, although network signature based malware removal application 106 is referred to as an application, this is illustrative only. Network signature based malware removal application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a medium configured to store or transport computer readable code in accordance with an embodiment. Some examples of computer program products are CD-ROM discs, DVDs, ROM cards, floppy discs, magnetic tapes, computer hard drives, servers on a network and signals transmitted over a network representing computer readable code. In another embodiment, a computer program product comprises a tangible storage medium configured to store computer readable code including CD-ROM discs, DVDs, ROM cards, floppy discs, magnetic tapes, computer hard drives and servers on a network.

As illustrated in FIG. 1, this medium belongs to the computer system itself. However, the medium is also removed from the computer system. For example, network signature based malware removal application 106 is stored in memory that is physically located in a location different from processor 108, e.g., memory 136 of server computer system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that execute network signature based malware removal application 106 in accordance with at least one of the embodiments as described herein. Similarly, in another embodiment, host computer system 102 and/or server computer system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, network signature based malware removal application 106 in accordance with one embodiment can be implemented in a wide variety of computer system configurations. In addition, network signature based malware removal application 106 could be stored as different applications in memories of different devices.

For example, network signature based malware removal application 106 could initially be stored in server computer system 130, and as necessary, a portion of network signature based malware removal application 106 could be transferred to host computer system 102 and executed on host computer system 102. Consequently, part of the functionality would be executed on processor 134 of server computer system 130, and another part would be executed on processor 108 of host computer system 102. In view of this disclosure, those of skill in the art can implement various embodiments in a wide variety of physical hardware configurations using an operating system and computer programming language of interest to the user.

In yet another embodiment, network signature based malware removal application 106 is stored in memory 136 of server computer system 130. Network signature based malware removal application 106 is transferred over network 124 to memory 112 in host computer system 102. In this embodiment, network interface 138 and I/O interface 110 would include analog modems, digital modems, or a network interface card. If modems are used, network 124 includes a communications network, and network signature based malware removal application 106 is downloaded via the communications network.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
    detecting a malicious network signature on a host computer system, the detection being accomplished through an examination of inbound data packets from a network coupled to the host computer system, said malicious network signature being associated with a malicious code;
    determining whether or not said malicious network signature is associated with malicious code, the determination taking place through a process comprising:
        identifying, by reviewing the malicious network signature, and data associated with the malicious network signature, one or more residual artifacts required to be present within the host computer system, in order for a malicious detection to be validated, wherein the system is configured to determine a residual artifact comprising a registry entry, the act of determination being triggered based on whether the requirement for the registry entry is specified within the malicious network signature;
        determining that at least one of the one or more identified residual artifacts are present within the host computer system, thus validating the malicious detection; and
    wherein upon a determination that said malicious network signature is validated, locating said malicious code on said host computer system, and
    removing said malicious code from said host computer system.

2. The computer-implemented method of claim 1 further comprising:
    providing a notification.

3. The computer-implemented method of claim 1 wherein upon a determination that said malicious network signature is not validated, exiting said computer-implemented method.

4. The computer-implemented method of claim 1 wherein said detecting a malicious network signature on a host computer system comprises:
    detecting a network communication on said host computer system; and
    mapping said network communication to said malicious network signature present as an entry in a malicious network signature database, said entry identifying said malicious code.

5. The computer-implemented method of claim 1 wherein said locating said malicious code on said host computer system comprises:
    locating at least one of a file associated with said malicious code, and a modification made to said host computer system by said malicious code.

6. The computer-implemented method of claim 1 wherein said removing said malicious code from said host computer system comprises:
    removing each of the following, if present in the host computer system: a file associated with said malicious code, a registry key associated with said malicious code, and a modification made to said host computer system by said malicious code.

7. The computer-implemented method of claim 1 wherein said validating whether or not said malicious network signature is associated with non-malicious code comprises:
    performing at least one validating heuristic to determine whether or not said malicious network signature is associated with said non-malicious code, said performing generating at least one result; and
    determining whether or not said malicious network signature is associated with said non-malicious code based on at least said at least one result.

8. The computer implemented method of claim 4 wherein said entry identifies one or more residual artifacts associated with said malicious code; and
    wherein said removing said malicious code further comprises:
    removing said one or more residual artifacts from said host computer system.

9. The computer-implemented method of claim 4 further comprising blocking said network communication.

10. A computer system comprising:
    a memory having stored therein a network signature based malware removal application; and
    a processor coupled to said memory, wherein execution of said network signature based malware removal application generates a method comprising:
    detecting a malicious network signature on said computer system, the detection being accomplished through an examination of inbound data packets from a network coupled to the host computer system, said malicious network signature being associated with a malicious code;
    determining whether or not said malicious network signature is associated with malicious code, the determination taking place through a process comprising:
        identifying, by reviewing the malicious network signature, and data associated with the malicious network signature, one or more residual artifacts required to be present within the host computer system, in order for a malicious detection to be validated, wherein the system is configured to determine a residual artifact comprising a registry entry, the act of determination being triggered based on whether the requirement for the registry entry is specified within the malicious network signature;
        determining that at least one of the one or more identified residual artifacts are present within the host computer system, thus validating the malicious detection;
    wherein upon a determination that said malicious network signature is validated, locating said malicious code on said computer system; and
    removing said malicious code from said computer system.

11. The computer system of claim 10, the method further comprising:
    providing a notification.

12. The computer system of claim 10, the method further comprising:
    wherein said detecting a malicious network signature on a computer system comprises:
    detecting a network communication on said computer system; and
    mapping said network communication to said malicious network signature present as an entry in a malicious network signature database, said entry identifying said malicious code.

13. The computer system of claim 10, the method further comprising:
    wherein said locating said malicious code on said computer system comprises:
    locating at least one of a file associated with said malicious code, and a modification made to said computer system by said malicious code.

14. The computer system of claim 10, the method further comprising:
wherein said removing said malicious code from said host computer system comprises:
removing each of the following, if present in the host computer system: a file associated with said malicious code, a registry key associated with said malicious code, and a modification made to said host computer system by said malicious code.

15. The computer system of claim 10 wherein said network signature based malware removal application comprises:
a network filter driver component;
a malicious network signature database component;
a validating heuristics component; and
a malware removal component.

16. The computer system of claim 15 wherein said network filter driver component is implemented as a kernel mode network filter driver.

17. A computer program product comprising:
a nontransitory computer readable storage medium storing computer program code comprising:
detecting a malicious network signature on a host computer system, the detection being accomplished through an examination of inbound data packets from a network coupled to the host computer system, said malicious network signature being associated with a malicious code;
determining whether or not said malicious network signature is associated with malicious code, the determination taking place through a process comprising:
identifying, by reviewing the malicious network signature, and data associated with the malicious network signature, one or more residual artifacts required to be present within the host computer system, in order for a malicious detection to be validated, wherein the system is configured to determine a residual artifact comprising a registry entry, the act of determination being triggered based on whether the requirement for the registry entry is specified within the malicious network signature;
determining that at least one of the one or more identified residual artifacts are present within the host computer system, thus validating the malicious detection;
wherein upon a determination that said malicious network signature is validated, locating said malicious code on said computer system; and
removing said malicious code from said computer system.

* * * * *